United States Patent [19]

Takeda et al.

[11] Patent Number: 5,210,058

[45] Date of Patent: May 11, 1993

[54] METHOD FOR PREPARING ORGANIC SILAZANE POLYMERS AND METHOD FOR PREPARING CERAMICS FROM THE POLYMERS

[75] Inventors: Yoshihumi Takeda, Jouetsu; Akira Hayashida, Higashimurayama; Toshinobu Ishihara, Jouetsu, all of Japan

[73] Assignee: Shin-Etsu Chemical Co., Ltd., Tokyo, Japan

[21] Appl. No.: 726,578

[22] Filed: Jul. 8, 1991

[30] Foreign Application Priority Data

Jul. 9, 1990 [JP] Japan .................................. 2-181131

[51] Int. Cl.$^5$ .................... C04B 35/56; C04B 35/58
[52] U.S. Cl. .................................. 501/97; 264/65
[58] Field of Search .................. 501/90, 92, 95, 96, 501/97; 528/28, 30; 264/65

[56] References Cited

U.S. PATENT DOCUMENTS

| | | | |
|---|---|---|---|
| 2,579,416 | 12/1951 | Cheronis | 260/2 |
| 2,579,418 | 12/1951 | Cheronis | 260/2 |
| 3,853,567 | 12/1964 | Verbeek | 106/44 |
| 4,705,837 | 11/1967 | Seyferth et al. | 528/31 |
| 4,833,107 | 5/1989 | Kaya et al. | 501/97 |
| 4,929,704 | 5/1990 | Schwark | 528/28 |
| 5,010,158 | 4/1991 | Colombier et al. | 528/28 |

OTHER PUBLICATIONS

Chemical Abstracts, vol. 66, No. 8, Jan. 2, 1967, Columbus, Ohio, US; abstract No. 29212U, Eugene G. Rochow: "Silazane Polymers", p. 2811.

*Primary Examiner*—Mark L. Bell
*Assistant Examiner*—Alan Wright
*Attorney, Agent, or Firm*—McAulay Fisher Nissen Goldberg & Kiel

[57] ABSTRACT

An organic silazane polymer is prepared by reacting ammonia gas with a mixture of a trihalosilane and a monohalosilane, for example, methyltrichlorosilane and trimethylchlorosilane in an organic solvent to form a silazane compound, and heating the silazane compound at 200 to 350° C. for polymerization. By melting, shaping, infusibilizing, and firing the silazane polymer, there is obtained a ceramic material.

10 Claims, No Drawings

METHOD FOR PREPARING ORGANIC SILAZANE POLYMERS AND METHOD FOR PREPARING CERAMICS FROM THE POLYMERS

This invention relates to a method for preparing organic silazane polymers which are suitable as precursors for Si—C—N and Si—C—N—O ceramic materials, and a method for preparing ceramic materials from the organic silazane polymers.

BACKGROUND OF THE INVENTION

Great attention has been paid to ceramic materials for their heat resistance, wear resistance, high-temperature strength and other advantages. However, ceramic materials are extremely difficult to mechanically work since they are hard and brittle. Thus most ceramic articles are prepared by sintering and precursor methods. In the sintering method, a ceramic material in powder form is pressed or otherwise molded into a desired shape and then fired for sintering. The precursor method is by melting an organic polymer as a ceramic precursor or dissolving it in a suitable solvent, molding the melt or solution into a desired shape, and then firing for converting the polymer into inorganic form. The precursor method is characterized by the potential manufacture of ceramic articles to a configuration which cannot be achieved with the powder sintering method, and especially adapted for the manufacture of fibers.

Among ceramics, SiC and $Si_3N_4$ are of great interest for high-temperature performance, more particularly because of heat resistance and high-temperature strength for the former and thermal shock resistance and fracture toughness for the latter. Extensive research works have been made on their precursors. The silicon carbide and nitride ceramic materials are also considered useful as reinforcements for fiber-reinforced composite materials by taking advantage of their light weight, heat resistance, and high strength features. Thus integration of these reinforcements with plastics, metals and ceramics is also an important subject.

In the prior art, ceramic fibers are prepared by forming an organic silazane polymer through pyrolytic polymerization and converting the polymer as a precursor into ceramic fibers composed of SiC and $Si_3N_4$ as described in U.S. Pat. No. 3,853,567 (Japanese Patent Publication No. 46995/1980). This method produces an organic silazane polymer by using a silazane compound resulting from a halosilane and an amine and heat polymerizing the compound at high temperatures in a Raschig ring packed column. This method has the following problems.

(1) Only limited reactants are available. The patent specification sets forth only methyltrichlorosilane and dimethyldichlorosilane as the halosilane and monomethylamine as the amine.

(2) This method produces an organic silazane polymer by passing a monomer or silazane compound through a column loaded with packings such as Raschig rings at a temperature as high as 200° to 800° C. This method allows the monomer to polymerize upon contact with the packings, but the extended contact with the packings can cause some polymers to convert into higher polymers. Such insoluble, infusible, highly polymerized solids will gradually accumulate in the column to clog the column, disturbing further continuation of polymerization reaction.

(3) The method based on a Raschig ring packed column allows a considerable amount of a crystalline by-product to form. The by-product precipitates and deposits on the gas phase-defining interior wall of the reactor, participating in reaction no longer. As a result, the end organic silazane polymer is obtained in a low yield of 36%.

For these drawbacks, the method of U.S. Pat. No. 3,853,576 is difficult to commercially effectively prepare an organic silazane polymer which is a ceramic precursor.

U.S. Pat. No. 3,892,583 discloses a method for preparing $SiC$—$Si_2N_4$ ceramics by reacting various chlorosilane compounds with ammonia and firing the resulting silazane polymers. It is described that for a mixture of alkylhalosilanes $RSiX_3$ and $R_3SiX$, the preferred mixing proportion is $RSiX_3/R_3SiX = 50$–$100$ mol %/ $50$–$0$ mol %. We have found, however, that if the mixing proportion of a trifunctional halosilane exceeds 50 mol %, there are formed larger amounts of silazane compounds which are insoluble in the solvent. Since the desired polymer is obtained in substantially reduced yields, this method is unsuitable for commercial manufacture.

The above-mentioned methods are difficult to manufacture high quality ceramics composed mainly of Si, C and N in a commercially advantageous manner. There is a desire for overcoming these problems.

Recently, there is an increasing need for application of ceramic precursors to ceramic coatings and binders. It is thus desired to reduce the cost of ceramic precursors although most ceramic precursors are less cost effective at present. There is also a desire for overcoming the economical problem.

SUMMARY OF THE INVENTION

Therefore, an object of the present invention is to provide a cost effective method for effectively preparing an organic silazane polymer, which is suitable as a ceramic precursor for producing Si—C—N or Si—C—N—O ceramic products of quality, in high yields. Another object is to provide a commercially advantageous method for preparing a ceramic of quality from the silazane polymer.

According to a first aspect of the present invention, there is provided an efficient method for preparing an organic silazane polymer. Ammonia gas is reacted with a mixture of an organic silicon compound of the general formula (I):

$$R^1SiX_3 \qquad (I)$$

wherein $R^1$ is selected from the group consisting of a hydrogen atom, methyl, ethyl, phenyl and vinyl radical, and X is a chlorine or bromine atom and another organic silicon compound of the general formula (II):

$$R^2R^3R^4SiX \qquad (II)$$

wherein $R^2$, $R^3$ and $R^4$ are independently selected from the group consisting of a hydrogen atom, methyl, ethyl, phenyl and vinyl radical, and X is a chlorine or bromine atom, in an organic solvent. The organic silicon compounds of formulae (I) and (II) are mixed in a molar ratio of from 10/90 to 45/55. The resulting silazane compound is then heat polymerized into an organic silazane polymer.

The organic silazane polymer thus obtained is suitable as a ceramic precursor for producing Si—C—N or Si—C—N—O ceramic products of quality in a commercially advantageous manner. More particularly, the steps of melting, shaping, infusibilizing, and firing the organic silazane polymer yield a ceramic material of quality.

As compared with prior art methods, the method of the present invention uses inexpensive reactants as represented by formulae (I) and (II), thus significantly reducing the manufacture cost of organic silazane polymers. The organic silazane polymers thus obtained are as heat stable and hydrolysis resistant as the organic silazane polymers obtained by Japanese Patent Application Kokai No. 210133/1988 or U.S. Pat. No. 4,847,345. By melting, shaping, infusibilizing, and firing the organic silazane polymers, Si—C—N or Si—C—N—O ceramic products of quality having enhanced high-temperature strength are obtained in a commercially advantageous manner.

DESCRIPTION OF THE PREFERRED EMBODIMENTS

The method for preparing an organic silazane polymer according to the present invention uses two starting reactants, which are an organic silicon compound of the general formula (I):

$$R^1SiX_3 \qquad (I)$$

wherein $R^1$ is selected from the group consisting of a hydrogen atom, methyl, ethyl, phenyl and vinyl radical, and X is a chlorine or bromine atom, and another organic silicon compound of the general formula (II):

$$R^2R^3R^4SiX \qquad (II)$$

wherein $R^2$, $R^3$ and $R^4$ are independently selected from the group consisting of a hydrogen atom, methyl, ethyl, phenyl and vinyl radical, and X is a chlorine or bromine atom.

Examples of the organic silicon compound of formula (I) include $HSiCl_3$, $CH_3SiCl_3$, $C_2H_5SiCl_3$, $C_6H_5SiCl_3$, $CH_2=CHSiCl_3$, etc. and corresponding bromides, with $CH_3SiCl_3$ being most preferred.

Examples of the organic silicon compound of formula (II) include $H_3SiCl$, $(CH_3)_3SiCl$, $(C_2H_5)_3SiCl$, $(C_6H_5)_3SiCl$, $(CH_2=CH)_3SiCl$, etc. and corresponding bromides, with $(CH_3)_3SiCl$ being most preferred.

In the practice of the present invention, ammonia gas is reacted with a mixture of organic silicon compounds of formulae (I) and (II) in an organic solvent. The organic silicon compounds of formulae (I) and (II) are mixed such that (I)/(II)=10-45%/90-55%, more preferably (I)/(II)=17-40%/83-60%, most preferably (I)/(II)=25-36%/75-64% as expressed in mol percent. With mixing ratios of the organic silicon compounds of formulae (I) and (II) outside the range, the resulting silazane compounds would sometimes become insoluble in the organic solvent. If the organic silicon compound of formula (II) is used in excess of the range, there would occur a larger drop in the yield per unit volume.

Examples of the organic solvent include hexane, benzene, toluene, xylene, diethyl ether, and dioxane. The solvents are used in enough amounts, in consideration of the amount of ammonium chloride by-produced during reaction, to allow for effective agitation during reaction and to ensure that no halogen be left unreacted. Usually, the amount of the organic solvent is determined relative to the total moles of halogen in the organic silicon compounds of formulae (I) and (II). For example, the organic solvent is used in a volume of 100 to 200 ml per mol of the halogen although the exact amount varies with a particular organic solvent used.

Ammonia gas is preferably used in an amount of at least twice, more preferably 2 to 2.1 times the total moles of halogen in the organic silicon compounds of formulae (I) and (II).

The reaction conditions may be properly determined without undue experimentation. Preferably a reaction temperature of from −20° C. to 150° C. is used and a temperature of from room temperature to 50° C. is more preferred for economy.

At the end of reaction, the by-product, hydrogen halide salt of ammonia is removed by filtration and the solvent is preferably stripped off. These work-up steps yield a silazane compound having a molecular weight of 400 to 700 as measured by the benzene molar depression of freezing point process. It is to be noted that the silazane compound can be readily controlled in molecular weight by changing the mixing ratio of reactants, organic silicon compounds of formulae (I) and (II).

The silazane compound thus obtained is then heat polymerized to synthesize an end silazane polymer. This heat polymerization reaction preferably takes place at a temperature of 200° to 350° C., more preferably 270° to 330° C. Reaction rate would be slow at temperatures lower than 200° C. whereas temperatures higher than 350° C. would accelerate the reaction rate to make it difficult to control the degree of polymerization. The reaction time is generally from 1 to 5 hours, preferably from 2 to 3 hours although it varies with the degree of polymerization and melting point of the desired polymer.

At the end of polymerization reaction, the reaction product is cooled, yielding a pale yellow silazane polymer in oily or solid state. Since the product often contains foreign matter, it is preferable to remove the foreign matter, for example, by dissolving the product in an organic solvent followed by filtration and stripping. The organic solvents used to this end include benzene, toluene, xylene, n-hexane, diethyl ether, tetrahydrofuran, etc. The resulting solution is stripped in vacuum (for example, 3 Torr at about 250° C.) to remove the solvent and low molecular weight substances, yielding a silazane polymer of higher purity.

The silazane polymers thus obtained are easy to shape and process. Therefore, the organic silazane polymers can be shaped into an appropriate form as a ceramic precursor, most often into fiber or sheet form. Alternatively, the organic silazane polymers may be used as binders and adhesives.

According to the present invention, ceramics are manufactured from the organic silazane polymers by a method involving melting, shaping, infusibilizing an firing steps.

Among the organic silazane polymers, those having a melting point of 60° to 250° C. and a molecular weight of 800 to 5,000 as measured by the benzene molar depression of freezing point process are preferred to this end. In the manufacture of ceramics, the silazane polymer resulting from the above-mentioned method may be subject to melting and shaping without further processing. However, it is preferred to remove insoluble matter from the polymer as mentioned above, for example, by dissolving the silazane polymer in an organic solvent followed by filtration and stripping in vacuum, or by filtering the melt while hot. Either of these work-up processes remove insoluble foreign matter from the polymer, ensuring high strength and consistent quality to shaped products.

The silazane polymer may be melted, shaped to any desired configuration, infusibilized, and then fired into ceramic articles of the desired configuration. No particular limits are imposed on these steps.

For example, ceramic fibers may be manufactured from the silazane polymer by melting the polymer and spinning the melt into green filaments or fibers by any conventional well-known method. The spinning temperature is preferably in the range of from 100° to 350° C. although it varies with the melting point of the polymer.

The green filaments or fibers melt spun from the polymer are then fired into inorganic form at high temperatures. For conversion into sintered inorganic form with the filament shape maintained, the filaments should be made infusible before firing.

For infusibilization, air heating is generally employed. In the practice of the invention, fibers of the organic silazane polymer are preferably made infusible by heating in air at a temperature of 50° to 250° C. Temperatures of lower than 50° C. would be insufficient to render the fibers infusible, allowing the fibers to be fused together during subsequent firing. Infusibilizing temperatures of higher than 250° C. would cause the polymer to melt again or excess oxygen to incorporate into the fibers so that the fibers lose strength.

Further, the infusibilizing method disclosed in U.S. Pat. Nos. 4,948,763 and 5,008,348 or EP Application 0 361 181 is also useful. Preferably, fibers are made infusible by treating them with a gas containing at least one vapor selected from silicon compounds of the general formula (III) shown below and then with humid air or ammonia-containing gas. More particularly, the as-spun filaments or fibers are subjected to a first infusibilizing step using an infusibilizing agent in the form of a silicon compound of formula (III), that is, the fibers are treated with a gas containing the silicon compound vapor. Then in a second step, the fibers are treated with humid air or ammonia-containing gas.

The infusibilizing agent used is a silicon compound of the following formula:

$R_aSiZ_{4-a}$ (III)

wherein R is a hydrogen atom, lower alkyl group, alkenyl group or aryl group, Z is a chlorine atom, bromine atom or iodine atom, and letter a is a number of 0 to 2, with the proviso that R groups may be the same or different when a is equal to 2. Examples of the silicon compound of formula (III) include $CH_3SiCl_3$, $(CH_3)_2SiCl_2$, $(C_2H_5)SiCl_3$, $(C_2H_5)SiHCl_2$, $(C_2H_5)_2SiCl_2$, $C_6H_5SiCl_3$, $(C_6H_5)_2SiCl_2$, $CH_2=CHSiCl_3$, $(CH_2=CH)_2SiCl_2$, $HSiCl_3$, $H_2SiCl_2$, $SiCl_4$, $H(CH_3)SiCl_2$, $H(CH_2=CH)SiCl_2$, and $(CH_2=CH)C_6H_5SiCl_2$. They may be used alone or in admixture of two or more. The preferred infusibilizing agents are $HSiCl_3$ and $SiCl_4$.

The fibers may be treated with a gas containing the infusibilizing agent in any desired manner. For example, an inert gas such as nitrogen ($N_2$) and argon (Ar) may be used as a carrier gas. The carrier gas is passed into the infusibilizing agent and then to a region where the fibers are placed whereupon the fibers are contacted with the carrier gas having the vapor of the agent carried thereon. The concentration of the infusibilizing agent in the gas may be controlled to a desired level by adjusting the temperature of the infusibilizing agent source so as to give an appropriate vapor pressure. If the concentration of the agent in the gas is too high, the gas may be diluted with an inert gas. In general, the concentration of infusibilizing agent vapor is preferably controlled to 0.001 to 0.1 mol of the agent per liter of the carrier gas. The treating temperature and time vary with a particular type of organic silazane polymer used. Usually, the treating temperature is a low temperature sufficient to maintain the polymer infusible, that is, a temperature sufficiently lower than the melting point of the polymer. The treating time is a sufficient time to render the fibers substantially infusible, preferably about 5 to about 240 minutes. At the end of the first infusibilizing step, the polymer fibers become insoluble in commonly used solvents, for example, benzene, hexane, toluene, and tetrahydrofuran (THF). However, the polymer fibers resulting from only the first infusibilizing step is not fully infusible and will melt during subsequent pyrolysis.

Therefore, the second step of treating with humid air or an ammonia-containing gas is essential to enhance the infusibility of polymer fibers. The manner of treatment in the second step is not particularly limited. In the case of treatment with humid air, for example, the fibers resulting from the first infusibilizing step may be simply exposed in air for a predetermined time to render the fibers completely infusible. The air exposure is simple, but somewhat difficult to consistently yield ceramic fibers having high strength and modulus because air humidity is not always constant. Due to varying humidity, subsequent pyrolysis will result in fibers having a varying oxygen content or fused fibers. Therefore, the second step is preferably carried out by passing air or an inert gas such as nitrogen and argon into water at a controlled temperature, more preferably bubbling air or inert gas through water at a predetermined rate, thereby forming air or inert gas containing saturated water vapor at the temperature. The resulting gas with saturated water vapor is passed over the fibers for a sufficient time to complete infusibilization. Usually, the treating temperature is sufficiently lower than the melting point of the polymer. The treating time is a sufficient time to complete infusibilization, preferably about 5 to about 240 minutes. The temperature of water into which air or inert gas is bubbled at the predetermined rate may preferably vary over the range of 0° to 100° C., more preferably 0° to 70° C., most preferably 0° to 30° C.

In the case of ammonia gas treatment, infusibilizing may be completed by exposing the fibers resulting from the first infusibilizing step to ammonia gas or ammonia gas diluted with an inert gas. In the second step, the ammonia gas concentration preferably ranges from 0.01 to 100% by volume, more preferably from 02 to 50% by volume, most preferably from 0.5 to 10% by volume. If the ammonia concentration is too high, the ammonia gas is diluted with a rare gas such as argon and helium or an inert gas such as nitrogen gas. The ammonia gas with or without a diluent gas may be passed over the fibers for a sufficient time to complete infusibilization. The treating temperature and time are approximately the same as described for the humid air treatment.

The shaped articles or fibers of the polymer thus made infusible are then fired at elevated temperatures for pyrolysis with or without tension applied thereto, yielding ceramic articles or fibers of Si—C—N or Si- —C—N—O system having improved strength, modulus of elasticity, heat resistance and oxidation resistance.

Firing is preferably carried out in vacuum or in an atmosphere of an inert gas such as argon and nitrogen ($N_2$), or hydrogen ($H_2$) or ammonia ($NH_3$) gas or a mixture thereof at a temperature of about 700° to about 2000° C., more preferably about 700° to about 1500° C. Most often the infusible fibers are fired under tension. Under such preferred conditions, there are produced ceramic fibers of quality as typified by a tensile strength of 200 to 300 kg/mm$^2$ and a modulus of elasticity of 14 to 25 t/mm$^2$.

In another embodiment, the silazane polymers are added as a binder to powder ceramic raw materials such as alumina, silicon carbide, silicon nitride, and boron nitride and mixtures thereof prior to firing. Ceramic articles of quality can be readily molded from a mixture of the organic silazane polymer and the raw ceramic powder. Most often, 2 to 30 parts, especially 5 to 20 parts by weight of the silazane polymer is added to 100 parts by weight of the raw ceramic powder. Articles molded from the mixture of silazane polymer and raw ceramic powder need not be infusibilized prior to firing if direct firing does not impair the article shape.

There has been described a method for preparing a silazane polymer in a commercially advantageous, cost effective manner, which polymer is well moldable and workable and has a good compromise of strength and flexibility for ease of handling and high ceramic yields so that it is useful as a ceramic fiber precursor.

In the method for manufacturing ceramic materials according to the present invention, the silazane polymers can be shaped into articles of the desired form, for example, fiber and sheet form and then fired into quality ceramic articles of Si—C—N or Si—C—N—O system having high strength, modulus of elasticity, heat resistance and oxidation resistance in high yields.

EXAMPLE

Examples of the present invention are given below by way of illustration and not by way of limitation.

EXAMPLE 1

Synthesis of Silazane Compound (1)

(methyltrichlorosilane/trimethylchlorosilane=17/83 mol %)

A four-necked 300-ml flask equipped with a stirrer, thermometer, gas inlet tube, and condenser was charged with 131.6 grams of dry toluene and then with 25.7 grams (0.17 mol) of methyltrichlorosilane and 89.8 grams (0.83 mol) of trimethylchlorosilane. Ammonia gas was then fed to the solution at room temperature at a rate of 60 liter/min. over one hour (total $NH_3$ added 2.68 mol). With stirring, the reaction solution was aged for one hour at room temperature until reaction was complete. Then, the ammonium chloride by-product was removed by filtration and washed with 132 grams of toluene. The combined filtrate was stripped at 120° C. and 30 Torr to remove the toluene and hexamethyldisilazane by-product therefrom, yielding 19.9 grams of a colorless clear silazane compound. This compound had a molecular weight of 436 as measured by the benzene molar depression of freezing point process and an IR spectrum in which absorption peaks appeared at 3400 cm$^{-1}$ for NH, 2960 cm$^{-1}$ for CH and 1260 cm$^{-1}$ for $SiCH_3$ Polymerization (1)

A 100-ml flask equipped with a stirrer, thermometer, gas inlet tube, and condenser was charged with 15 grams of the silazane compound resulting from Silazane Synthesis (1), purged with nitrogen gas, and then slowly heated. A low molecular weight compound distilled out at a temperature of 270° C. The temperature was further raised to 320° C. at which the contents were maintained for two hours. The reactor was then cooled down, yielding 8.25 grams of a pale yellow solid. This product had a molecular weight of 2468 as measured by the benzene molar depression of freezing point process and a melting point of 210° C. An IR spectrum in which absorption peaks appeared at 3400 cm$^{-1}$ for NH, 2960 cm$^{-1}$ for CH and 1260 cm$^{-1}$ for $SiCH_3$.

Fiber Formation (1)

The silazane polymer (10 grams) obtained in Polymerization (1) was heated at 250° C. and melt spun by means of a mono-hole spinning machine having an orifice of 0.3 mm in diameter. No breakage occurred during spinning at a take-up speed of 350 m/min. Pieces of the green filament were rendered infusible by heating to 100° to 220° C. in air at a heating rate of 10° C. hour. Thereafter, the filament pieces under some tension were heated at a rate of 200° C./hour in nitrogen stream and held at 1,200° C. for 30 minutes for sintering, obtaining ceramic fibers in a yield of 72%. The ceramic fibers had a diameter of about 12 μm, a tensile strength of 175 kg/mm$^2$, and a modulus of elasticity of 14.2 ton/mm$^2$. An elemental analysis of the fibers showed that they were Si—C—N—O system fibers consisting of Si 53%, C 14%, N 20.5%, and O 13%. X-ray diffratometry showed that the ceramic fibers were amorphous.

EXAMPLE 2

Synthesis of Silazane Compound (2)

(methyltrichlorosilane/trimethylchlorosilane=21.3/78.3 mol %)

A similar 500-ml flask equipped as in Silazane Synthesis (1) was charged with 25.7 grams (0.17 mol) of methyltrichlorosilane, 66.4 grams (0.612 mol) of trimethylchlorosilane, and 124 grams of dry toluene before ammonia gas was fed in a similar manner. The total amount of ammonia added was 38.1 grams (2.244 mol). The reaction solution was stirred for a further one hour at room temperature until reaction was complete. Then, the reaction solution was heated to 50° C., 13.4 grams (0.224 mol) of ethylenediamine was slowly added through a dropping funnel over 20 minutes, and the reaction solution was aged at 50° C. for 30 minutes. During the process, the ammonium chloride by-product was converted into ethylenediamine hydrogen chloride salt with ammonia formed. Next, the reaction solution was cooled to room temperature and again stirred at room temperature for 30 minutes. 242.4 grams of a 20% sodium hydroxide aqueous solution was added all at once to the reaction solution, which was stirred for 20 minutes. With stirring ceased, the reaction solution separated into two layers. The reaction solution was allowed to stand in a separatory funnel for 15 minutes and the lower layer was removed. Stripping off the toluene and hexamethyldisilazane by-product in vacuum (30 Torr at 120° C.) from the organic layer yielded 17.8 grams of a viscous clear silazane compound. This compound had a molecular weight of 512 as measured by the benzene molar depression of freezing point process.

Polymerization (2)

By following the procedure of Polymerization (1), 15 grams of the silazane compound resulting from Silazane Synthesis (2) was heated at 320° C. for one hour to effect polymerization reaction, yielding 9.9 grams of a silazane polymer. This product had a molecular weight of 2508 and a melting point of 215° C.

Fiber Formation (2)

The silazane polymer (10 grams) obtained in Polymerization (2) was melt spun at 255° C. using the same spinning apparatus as in Fiber formation (1). Pieces of the filament were suspended in a mullite tubular furnace having a diameter of 50 mm and a length of 1 m. After the furnace was heated to 40° C., the filaments were rendered infusible by passing trichlorosilane gas in $N_2$ gas at a silane gas concentration of 0.7% by volume for 30 minutes, and then passing ammonia gas at a concentration of 6% by volume for 30 minutes. The furnace was purged with nitrogen gas and then heated at a suitable rate whereupon the filaments were fired at 1250° C. for 1 hour in a nitrogen stream. There were obtained black lustrous fibers in a yield of 75%. The ceramic fibers had a diameter of about 11 μm, a tensile strength of 254 kg/mm$^2$, and a modulus of elasticity of 19.3 ton/mm$^2$. X-ray diffractometry showed that the ceramic fibers were amorphous. An elemental analysis showed that the fibers were essentially Si—C—N system fibers consisting of Si 59%, C 17%, and N 24% without detectable O.

EXAMPLE 3

Synthesis of Silazane Compound (3)

(methyltrichlorosilane/trimethyl-chlorosilane=29.4/70.6 mol %)

The procedure of Silazane Synthesis (2) was repeated except that the charges were 127.1 grams (0.85 mol) of methyltrichlorosilane, 221.5 grams (2.04 mol) of trimethylchlorosilane, and 448 grams of toluene. There was yielded 76 grams of a silazane compound having a molecular weight of 550.

Polymerization (3)

By following the procedure of Polymerization (1), 60 grams of the silazane compound resulting from Silazane Synthesis (3) was heated at 330° C. for one hour to effect polymerization reaction, yielding 44 grams of a silazane polymer. This product had a molecular weight of 2038 and a melting point of 199° C.

Molding of Ceramic Article

The silazane polymer (10 grams) obtained in Polymerization (3) was dissolved in 30 grams of xylene. To the solution was added 80 grams of fine powder $Si_3N_4$. The mixture was then press molded into a disk having a diameter of 2 cm and a thickness of 2 mm. The molded disk was placed in a firing furnace, which was heated at a rate of 1° C./min. in a nitrogen stream whereupon the disk was pre-fired at 800° C. for one hour and then fired at 1,700° C. for 4 hours. The resulting ceramic disk had a density of 2.85 g/cm$^3$ and a flexural strength of 30 kg/cm$^2$.

EXAMPLE 4

Synthesis of Silazane Compound (4)

(methyltrichlorosilane/trimethylchlorosilane=45/55 mol %)

The procedure of Silazane Synthesis (2) was repeated except that the charges were 102.8 grams (0.688 mol) of methyltrichlorosilane, 89.6 grams (0.83 mol) of trimethylchlorosilane, and 282 grams of toluene. There was yielded 58.1 grams of a silazane compound having a molecular weight of 650 as measured by the benzene molar depression of freezing point process.

Polymerization (4)

By following the procedure of Polymerization (1), 30 grams of the silazane compound resulting from Silazane Synthesis (4) was heated at 320° C. for 30 minutes to effect polymerization reaction, yielding 24 grams of a silazane polymer. This product had a molecular weight of 1850 and a melting point of 145° C.

COMPARATIVE EXAMPLE

As in Silazane Synthesis (2), a 1-liter flask was charged with 67.3 grams (0.5 mol) of methyltrichlorosilane and 147 grams of dry toluene before ammonia gas was fed in a similar manner. The total amount of ammonia added was 3.3 mol. The reaction solution was stirred for a further one hour at room temperature until reaction was complete. Then, the reaction solution was heated to 50° C., 54 grams (0.9 mol) of ethylenediamine was slowly added through a dropping funnel over 20 minutes, and the reaction solution was aged at 50° C. for 30 minutes. Next, the reaction solution was cooled to room temperature and 324 grams of a 20% sodium hydroxide aqueous solution was added all at once to the reaction solution, which was stirred for 20 minutes. With stirring ceased, an insoluble solid remained, which was removed by filtration. The filtrate was allowed to separate into two layers. The lower layer was removed using a separatory funnel. Stripping off the toluene in vacuum (30 Torr at 120° C.) from the organic layer yielded only 6.9 grams of a silazane compound.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing an organic silazane polymer comprising the steps of:
reacting ammonia gas at a temperature of from −20° to 150° C. with a mixture of 10 to 45 mol % of an organic silicon compound of the general formula (I):

$$R^1SiX_3 \qquad (I)$$

wherein $R^1$ is selected from the group consisting of a hydrogen, methyl, ethyl, phenyl and vinyl, and X is chlorine or bromine and 90 to 55 mol % of another organic silicon compound of the general formula (II):

$$R^2R^3R^4SiX \qquad (II)$$

wherein $R^2$, $R^3$ and $R^4$ are independently selected from the group consisting of hydrogen, methyl, ethyl, phenyl and vinyl, and X is chlorine or bromine in an organic solvent to form a silazane compound, and heating the silazane compound at a temperature of 200° to 350° C. for 1 hour to 5 hours in the absence of packing to polymerize the silazane compound.

2. The method of claim 1 wherein the organic silicon compound of formula (I) is selected from the group consisting of $HSiCl_3$, $CH_3SiCl_3$, $C_2H_5SiCl_3$, $C_6H_5SiCl_3$ and $CH_2=CHSiCl_3$.

3. The method of claim 2 wherein the organic silicon compound of formula (I) is methyltrichlorosilane.

4. The method of claim 1 wherein the organic silicon compound of formula (II) is selected from the group consisting of $H_3SiCl$, $(CH_3)_3SiCl$, $(C_2H_5)_3SiCl$, $(C_6H_5)_3SiCl$ and $(CH_2=CH)_3SiCl$.

5. The method of claim 4 wherein the organic silicon compound of formula (II) is trimethylchlorosilane.

6. The method of claim 1 wherein ammonia gas is used in an amount of at least twice the total moles of halogen in the organic silicon compounds of formulae (I) and (II).

7. The method of claim 1 wherein the organic solvent is selected from the group consisting of hexane, benzene, toluene, xylene, diethyl ether, and dioxane.

8. A method for producing a ceramic material, comprising the steps of melting, shaping, infusibilizing, and firing the organic silazane polymer prepared by the method of claim 1.

9. The method of claim 8 wherein the organic silazane polymer has a melting point of 60° to 250° C. and a molecular weight of 800 to 5,000 as measured by the benzene molar depression of freezing point process.

10. The method of claim 2 wherein the organic silicon compound of formula (II) is selected from the group consisting of $H_3SiCl$, $(CH_3)_3SiCl$, $(C_2H_5)_3SiCl$, $(C_6H_5)_3SiCl$ and $(CH=CH)_3SiCl$.

* * * * *